United States Patent [19]

Molnar

[11] Patent Number: 4,551,885
[45] Date of Patent: Nov. 12, 1985

[54] FISH DECAPITATOR AND EVISCERATOR

[75] Inventor: Robert Molnar, Windsor, Canada

[73] Assignee: Simnar, Inc., Windsor, Canada

[21] Appl. No.: 477,101

[22] Filed: Mar. 21, 1983

[51] Int. Cl.⁴ ............................................. A22C 25/14
[52] U.S. Cl. ............................................. 17/59; 17/63
[58] Field of Search ........................ 17/58, 59, 61, 63

[56] References Cited

U.S. PATENT DOCUMENTS

| | | | |
|---|---|---|---|
| 1,381,989 | 6/1921 | Graham | 17/63 |
| 1,471,567 | 10/1923 | Nicholson | 17/58 |
| 2,166,939 | 7/1939 | Christiansen | 17/59 |
| 2,536,826 | 1/1951 | Taus | 17/58 X |
| 3,469,278 | 9/1969 | Oates | 17/63 X |
| 4,321,729 | 3/1982 | Ollik | 17/63 |

*Primary Examiner*—Willie G. Abercrombie
*Attorney, Agent, or Firm*—Cullen, Sloman, Cantor, Grauer, Scott & Rutherford

[57] ABSTRACT

A fish decapitator and eviscerator comprises a framework mounting a power driven conveyor belt including a series of flexibly connected open ended transverse containers, each container adapted to support a fish. An adjustable stop is spaced from the containers, and a power rotated brush is mounted upon the framework and rotatable in a plane at right angles to the belt. The bristles frictionally engage each fish thereunder during feeding of the belt laterally advancing the fish outwardly of its container successively to the stop. A power rotated knife rotates in a plane parallel to the stop for successively severing the fish heads during longitudinal movement of the belt. The fish move downwardly around the end of the belt and drop belly down into a transverse feed channel. A conveyor underlies the channel and advances the fish in a line to and between a pair of opposed horizontal coplanar flexible fish holding and feeding conveyors. A power rotated cutter disc in a vertical plane slits each fish lengthwise on its belly side as it advances. Each fish successively moves over an upright separator support plate having a rounded edge. Water is fed upwardly into the slit fish body to eviscerate the fish. An upright power rotated scraper disc with cutting edges is arranged forward of the support plate for further cleaning out the fish as it is fed thereover, the fish falling by gravity for accumulation within a suitable container.

7 Claims, 10 Drawing Figures

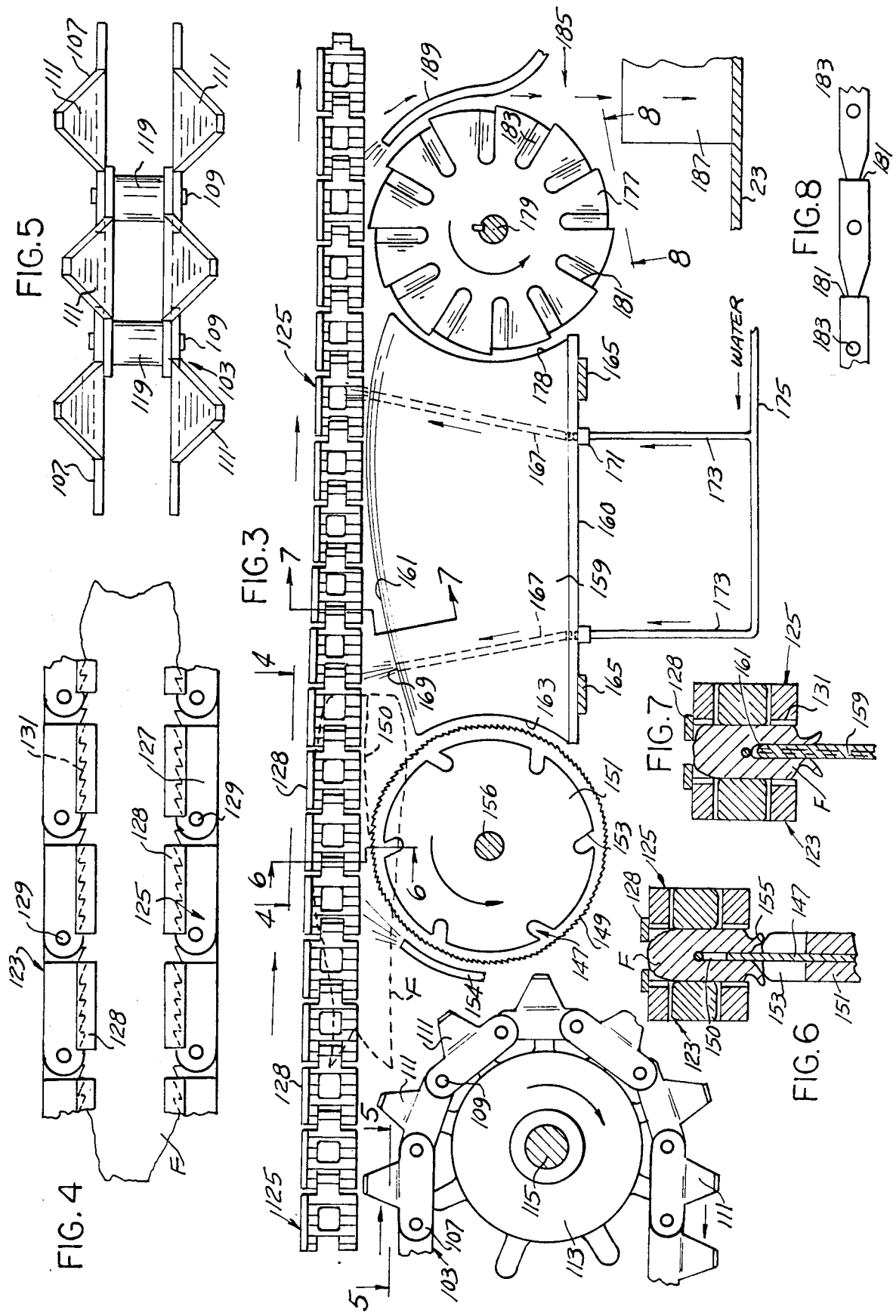

FISH DECAPITATOR AND EVISCERATOR

BACKGROUND OF THE INVENTION

Heretofore in the commercial handling of small fish such as smelt, sardines, anchovies and herring for illustration having a length in the general range of four to seven inches, these fish have been difficult to behead and eviscerate, except manually. It has been found over many years that this process is unprofitable, since it is time consuming and production is extremely limited.

In the commercial handling of even small fish wherein large quantities must be processed on a continuous basis as for example one to two thousand fish per hour, the above described small fish have not been subjected to mechanized equipment so as to decapitate and eviscerate these fish commercially in large quantities.

Heretofore there has been no practical mechanism which accomplishes these functions and does it in a practical efficient manner. In most cases, the decapitating and eviscerating is done by hand.

Heretofore in processing a fish in commercial quantities, the Applicant has employed a fish orienter and feeder which is adapted to receive large quantities of fish and orient them so as to move forwardly head first for further processing.

RELATED PATENT APPLICATION

A fish feeding and orienting automatic device of this nature is disclosed in Applicant's copending patent application Ser. No. 288,628, filed July 30, 1981, now U.S. Pat. No. 4,399,588. Such fish feeding and orienting mechanism may be conveniently used in conjunction with the present fish decapitator and eviscerator for supplying in a continuous manner and in commercial quantities fish which are oriented to move head first into fish decapitator and eviscerator.

SUMMARY OF THE INVENTION

The present invention is directed to a practical fish decapitator and eviscerator adapted to continuously receive fish for successively beheading same, advancing the fish into and longitudinally of an eviscerating mechanism for delivering the decapitated and eviscerated fish to an accumulation area.

An important feature of the present invention is to provide a fish decapitator which includes a continuous conveyor belt upon a framework having a series of flexibly connected open ended containers which extend transversely of the belt and each of which is adapted to receive and transport a fish.

A further feature includes a stop upon the framework spaced from the containers together with a power operated brush which overlies the belt and which is rotatable in a plane at right angles to the length thereof so that the brush bristles frictionally engage each fish thereunder during feeding of the belt to laterally advance the fish outwardly of its container to said stop. So advanced that the fish are fed past a power rotated knife successively severing their heads during longitudinal movement the fish within their respective containers.

An important feature is that each fish respectively lies upon one side with its belly forward, with the decapitated fish adapted to move in its container to and downwardly around the end of the conveyor remaining in a horizontal position and dropping from said container with its belly down.

A further feature includes a transverse elongated fish feed channel upon the framework which underlies the conveyor forwardly of the end thereof for successively receiving the fish as they drop from the conveyor belt, each fish remaining horizontal with its belly down.

A further feature includes a continuous power operated feed sprocket chain which underlies the channel and is adapted to support and advance the fish successively in a line within said channel.

A further feature includes a pair of opposed horizontal coplanar flexible laterally yieldable fish feeder sprocket chains upon the framework arranged at the end of the channel longitudinally thereof for successively receiving each fish therebetween frictionally and for operatively engaging its opposite sides and for advancing the fish longitudinally.

A further feature includes a power rotated cutter disc upon the framework which is arranged in a vertical plane centrally underlying the feeding mechanism adapted to operatively engage and slit each fish on its belly side along its length as it advances thereover.

A further feature includes an upright guide support plate upon the framework arranged forward of, adjacent to and coplanar with said cutter disc centrally of the fish feeding conveyors, over which the fish is longitudinally fed holding the belly side open along its length.

A further feature includes within said guide support plate water delivery conduits connected to a source of pressurized water outletting at its top edge for flushing out and eviscerating each fish during longitudinal movement thereover.

A further feature includes a power rotated scraper disc which rotates in a vertical plane and is arranged forwardly of and coplanar with said support plate and is adapted for further cleaning out the interior of the fish longitudinally thereof as the fish moves thereover subsequently dropping into a collection area.

A further feature includes a power transmission means within the framework of the fish decapitator and eviscerator for supplying power to the fish feeding brush, power rotated knife for severing fish heads, the horizontal conveyor belt feeding the fish past the power rotated knife. The power means further includes a drive for the conveyor for the fish feeding channel, power to the fish feeding conveyors, power to the cutter disc which slits the belly of the fish lengthwise and power to the rotatable scraper disc which finishes cleaning the fish body.

A further feature includes a water pipe within the framework adapted for connection to a source of water under pressure and wherein a plurality of branch water pipes are connected thereto for delivery of washing and flushing water to the power rotated knife and the beheaded fish as they drop into the transverse feed channel, and fluid through conduits upon the support plate for feeding pressurized water to the interior of the slit fish body eviscerating the same and washing down other areas of the equipment.

These and other objects and features will be seen from the following specification and claims in conjunction with the appended drawings.

THE DRAWINGS

Figure 1:
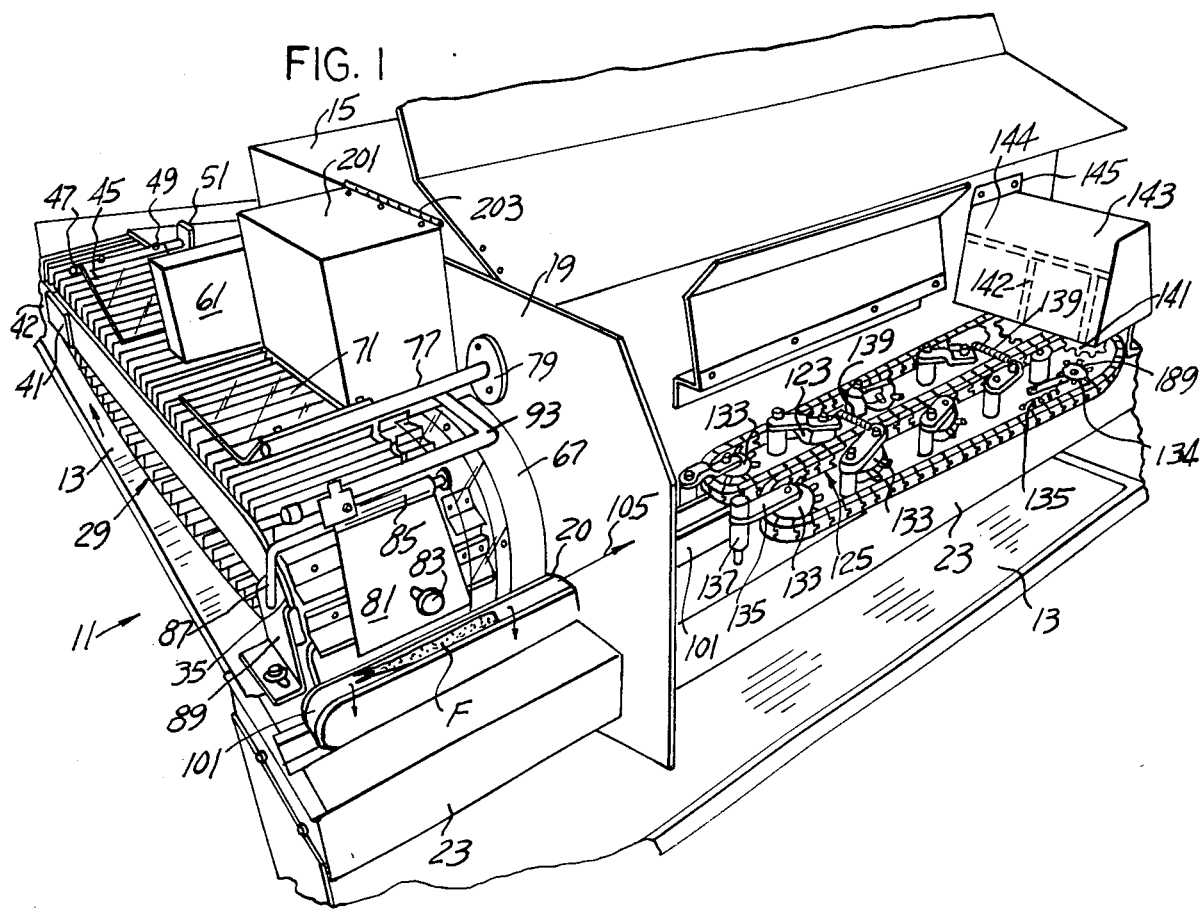
FIG. 1 is a fragmentary perspective view of the present fish decapitator and eviscerator.

FIG. 3 is a schematic fragmentary partly sectioned side elevational view of the fish support and feeding mechanism, cutter for slicing the fish lengthwise, the spreader support plate for supporting fish and holding them open with hydraulic mechanism for flushing out and eviscerating the fish body and the power rotated scraper disc being on an increased scale, defining the eviscerator assembly not shown in FIG. 1.

FIG. 4 is a fragmentary plan view taken in the direction of arrows 4—4 of FIG. 3, on an increased scale.

FIG. 5 is a fragmentary plan view on an increased scale taken in the direction of arrows 5—5 of FIG. 3.

FIG. 6 is a fragmentary section on an increased scale taken in the direction of arrows 6—6 of FIG. 3.

FIG. 7 is a fragmentary section taken in the direction of arrows 7—7 of FIG. 3 on an increased scale.

FIG. 8 is a fragmentary view taken in the direction of arrows 8—8 of FIG. 3, on an increased scale.

Figure 9:
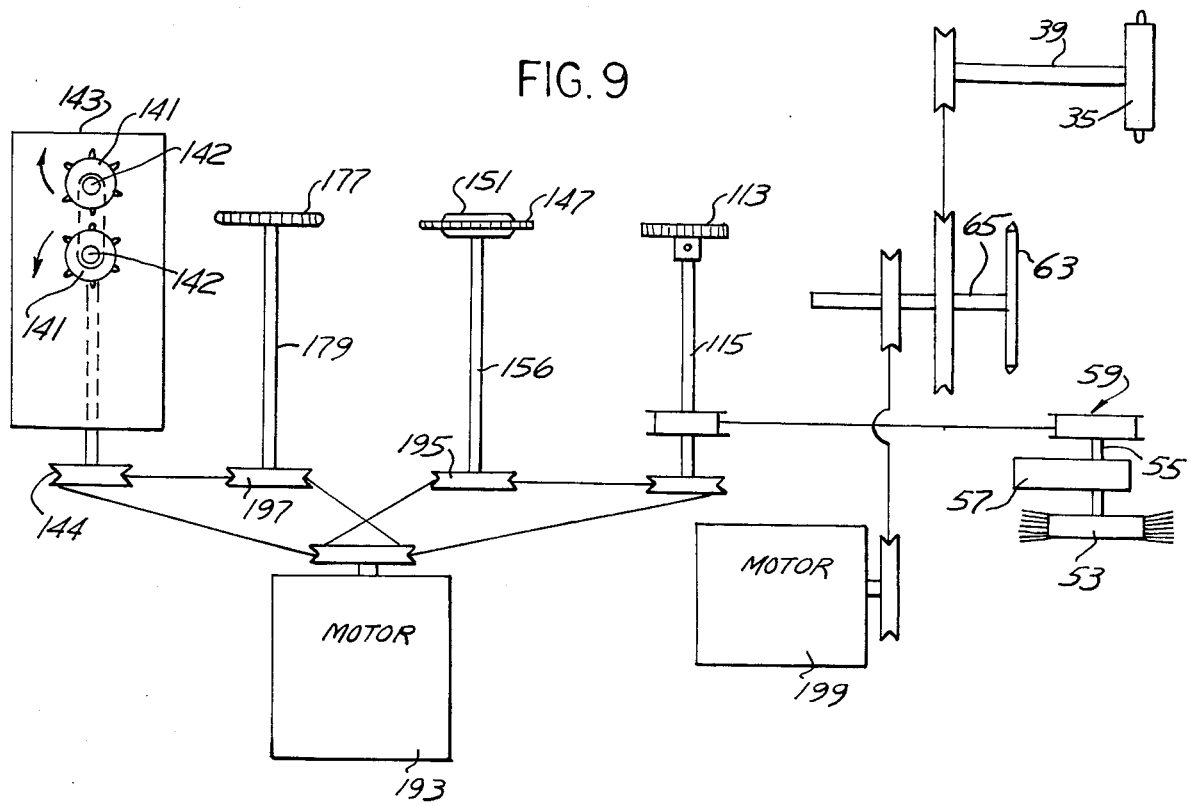

FIG. 9 is a schematic diagram of the power drive mechanism.

Figure 10:
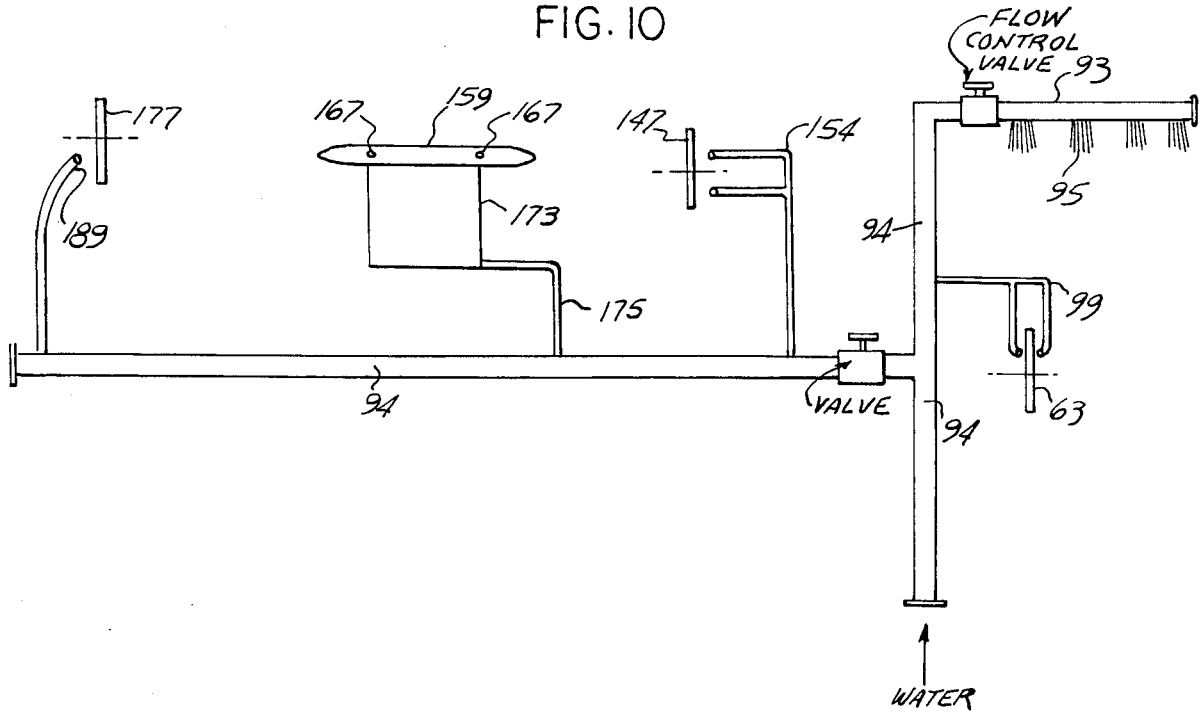

FIG. 10 is a schematic view of the hydraulic flushing mechanism.

It will be understood that the above drawings illustrate merely one embodiment of the invention and that other embodiments are contemplated within the scope of the claims hereafter set forth.

DETAILED DESCRIPTION OF AN EMBODIMENT OF THE INVENTION

Figure 2:
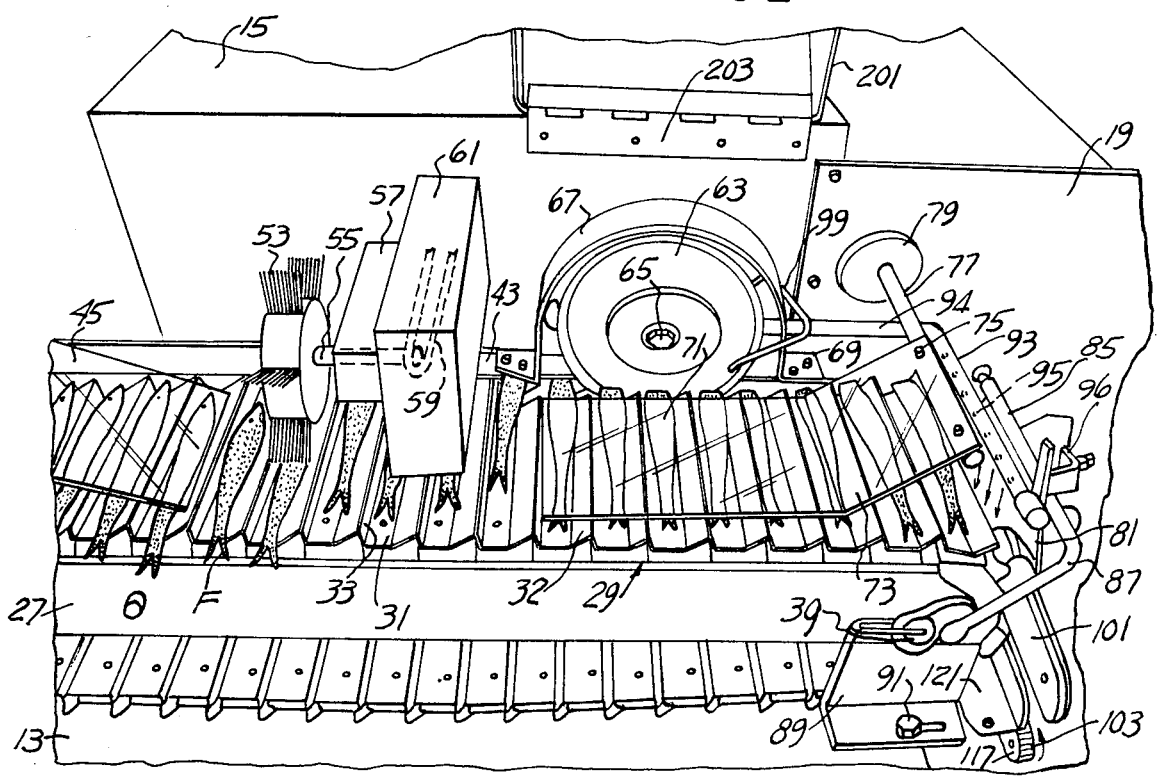
FIG. 2 is a fragmentary front perspective view thereof.

Referring to the drawing, the present fish decapitator and eviscerator 11, FIGS. 1 and 2, includes framework 23, the underlying water collector tray 13, the housing 15 and transversely thereof the conveyor support platform 27. The housing includes upright partition 19 apertured at 20.

A power driven horizontally disposed continuous conveyor belt 29 overlies, extends along and is mounted upon the conveyor support 27, FIG. 2 forming a part of the framework.

The continuous conveyor belt 29 includes a series of flexibly connected open ended containers 31 of general U-shape in cross section. Each container has an upright trailing stop wall 33 on one side. The opposite leading side 32 of each container is inclined forwardly and upwardly at an acute angle to the vertical.

The respective open ended containers 31 are each adapted to receive and transport therein a small fish F, such as smelt, sardines, anchovis, herring, etc., i.e., having a length 4"–7", approximately. As shown in FIG. 2, each fish is oriented to lie upon one side with its belly facing forwardly upon the conveyor 29 within its respective container 31.

Mounted upon the framework spaced from the one ends of the containers 31 is an elongated adjustable stop plate 43 parallel to conveyor 29. Adjustment is often needed for fish of different length.

The forward end of the continuous conveyor belt 29 is mounted over and driven by feed roller 35, FIG. 1, which is journaled between a pair of opposed brackets 89, FIG. 2, adjustably mounted at 91 upon framework 27. The opposite end of the conveyor belt is supported upon a corresponding idler roller 42, fragmentarily shown in FIG. 1. Said idler roller is journaled between a pair of opposed idler support brackets 41 which form part of conveyor support platform 27.

Within housing 15 there is provided a pair of motors 193, 199, FIG. 9 providing power drive to a series of driven members hereafter described. The drive roller 35 for the feed conveyor 29 is journaled at 39, FIG. 2, between the opposed pair of support brackets 89 and is connected to motor 199, FIG. 9.

Yieldable fish hold down plate 45, constructed preferably of a transparent plastic material, overlies feed conveyor 29 and at its trailing end is spaced above said conveyor and mounted upon horizontal bar 47 by fasteners 49. Bar 47 projects from and is secured to the upright bar support 51 connected to conveyor support 27. Hold down plate 45 is inclined forwardly and downwardly and at its forward edge overlies the respective containers 31 of the flexible conveyor 29 adjacent the transversely arranged fish feed brush 53.

Said brush is mounted upon a horizontal drive shaft 55 and is spaced above conveyor 29 with its bristles adapted for rotation in a plane at right angles thereto. Said drive shaft is journaled upon support 57 upon housing 15 and the adjacent cover 61 within which is disposed a power transmission assembly or flexible timing belt 59 or the like for driving engagement with shaft 55, FIG. 9.

Fish hold down plate 45 engages the transverse containers 31 closely adjacent and in advance of the brush 53 for assuring that the fish F are lying upon their sides within the respective containers 31 as they move below brush 53. During continuous forward feed movement of the conveyor belt 29, brush 53 is rotating in a counter clockwise direction so that its bristles frictionally engage the individual fish thereunder for advancing the fish outwardly of one open end of the containers 31 into engagement with the stop 43 parallel to belt 29.

The stop 43 is adjustable and arranged a distance from the adjacent open ends of the individual containers 31 as to permit the head portion of the fish to be advanced laterally outward of the conveyor belt so as to move in a path for operative registry with the revolving power operated knife 63. Said kife is secured upon drive shaft 65 journaled upon housing 15 and the framework 13 adapted for connection with a suitable power driving means, FIG. 9 for rotating the knife disc 63 and for severing the heads off the fish as they move past knife 63, FIG. 2.

The trailing side 33 of the flexibly interconnected fish containers 31 is substantially upright so as to forcefully move the fish forward while remaining horizontal into operative engagement with revolving knife 63. The heads drop downwardly into the collection tray 13 under the framework 23, further assisted by the flow of pressurized water through the branch conduit 99 connected to a water pipe within the housing and in turn connected to a source of pressurized water, FIG. 10.

Semi-circular knife cover 67 overlies the rotatable knife 63 with the lower ends thereof outturned providing mount flanges 69 suitably secured to framework 27. Adjacent and outwardly of the power operated decapitating knife 63, there is provided a second fish hold down plate 72, preferably constructed of a transparent plastic material, which overlies the corresponding fish containers 31 for retaining the fish F therein as they pass transversely with respect to said knife. The forward end 73 of hold down plate 71 is inclined upwardly and at its leading edge is anchored as at 75 to the mount bar 77 which extends transversely of conveyor belt 29 and is secured at 79 upon partition 19.

Shown in FIGS. 1 and 2 and arranged at the forward end of conveyor belt 29 is the substantially upright fish retainer plate 81 having a counter-weight 83. Said plate is pivotally mounted at 85 upon the support bar 87. Said support bar at its outer end has a right angular depending portion which extends to and is secured to bracket 89.

Branch water pipe 93 extends transversely over the forward end of flexible conveyor belt 29, is capped at its outer end and on its undersurface has a series of longitudinally spaced spray or jet apertures 95 for providing a water spray down onto the fish F as they move around the forward end of the conveyor 29 within their respective containers 31.

The water pipe 93 is a branch of a main water pipe 94 within the housing 15 connected to a source of water under pressure, FIG. 10. The bracket 96 is secured to the fish retainer plate 81 for adjustably limiting pivotal movements thereof.

Mounted upon conveyor framework 27 and arranged below the forward end of conveyor 29 there is provided a transverse feed channel 101 adapted to receive the decapitated fish as they move around and downwardly of the forward end of the conveyor belt 29. The fish are positioned in the respective containers 31 forming a part of the conveyor belt 29 in such fashion that the belly side of the fish are faced forwardly, FIG. 2, so that upon dropping off of the fish at the forward end of the conveyor as guidably retained by the plate 81, the fish drop belly side down in a horizontal position into the transverse feed channel 101, FIG. 1.

The leading edges 32 of the individual fish containers 31 are inclined forwardly at an acute angle to the vertical so that as said containers move into a substantially vertical position over the end of the conveyor 29, the fish therein will conveniently slide out of the containers 31 and into the transverse underlying feed channel 101 assisted by water spray 95.

Underlying and arranged longitudinally of channel 101 is an elongated feed sprocket chain 103, FIGS. 2 and 3 which is substantially horizontal and supportably engages the individual fish successively as dropped to said channel. Chain 103 is adapted for feeding the fish in a direction transverse to the movement of the fish along the conveyor belt 29.

The feed sprocket chain 103 shown in FIG. 2 is further shown in detail and on an increased scale in FIGS. 3 and 5, said sprocket chain 103 lying in a vertical plane. Feed sprocket chain 103 at its forward end is mounted upon and extends around and is drivingly engaged by the drive sprocket 113 which engages the respective transverse rollers 119 upon the corresponding pivots 109 which interconnect the series of opposed pairs of chain segments 107. Said segments from a continuous feed sprocket chain 103.

The opposite end of said chain is supported by a corresponding idler sprocket 117, FIG. 2.

The opposed pairs of chain segments 107 have formed thereon diverging guides 111 which extent upwardly and outwardly and are arranged upon the underside and along the length of channel 101. These guides receive the fish F and hold them upright as they advance in a continuous line along the length of channel 101. Said channel, FIGS. 1 and 2, is arranged at the end of the flexible conveyor belt 29 so as to receive the fish F as it drops thereinto in a horizontal position. The fish move along channel 101 through the aperture 20 within partition 19 for direction into that portion of the machine for eviscerating the fish successively as in FIG. 1 and FIGS. 3 through 8. Said guides keep the fish belly side down.

As the fish are advanced in a line transversely along channel 101 supported upon and driven by sprocket chain 103 they are advanced into and between a pair of opposed horizontal coplanar flexible laterally yieldable fish feeder means or sprocket chain assemblies 123, 125, FIG. 1.

The fish feeder means include a pair of opposed coplanar horizontally extending feed sprocket chains 123 and 125 which overlie the support 23 forming part of housing 15, FIG. 1.

The opposed pair of horizontal feed sprocket chains are arranged forwardly of the end of channel 101 and are adapted to receive between the adjacent portions of the chains 123, 125 the succeeding fish which are gripped and fed longitudinally by the said sprocket chains, sometimes referred to as the yieldable fish feeder means.

As shown in FIGS. 3 and 4, each of the feed sprocket chains 123 and 125 include a series of segments or links 127 pivotally interconnected at 129, FIG. 4, wherein a plurality of forwardly extending serrations 131 are provided to frictionally engage opposite sides of the fish as it advances belly down holding the fish and for advancing the fish longitudinally with respect to the eviscerating mechanism shown in detail in FIGS. 3-8. Each of the chain links 127 have inwardly directed fish hold down flanges 128 to retainingly engage the back of the fish. Said flanges serve to hold down the fish so as to stay within sprocket chain conveyors 123, 125.

Opposed coplanar laterally yieldable idler sprockets 133 support the one ends of the individual continuous feed sprockets chains 123, 125. These sprockets are mounted upon corresponding arms 135, FIG. 1, pivotally mounted upon the upright pivot posts 137 which project from base chain support 23. Additionally laterally spaced and laterally yieldable pairs of opposed idler sprockets 133 are similarly mounted upon corresponding arms 135 and pivot posts 137 and are normally biased towards each other by tension springs 139.

The forward ends of the coplanar horizontal feed sprocket chains 123 and 125 are mounted upon, around and driven by a pair of opposed coplanar drive sprockets 141. These depend from corresponding drive shafts 142 within the housing 143 for supporting and drivingly engaging the sprockets 141 for rotation in opposite directions, to provide a continuous support and feed for the adjacent inner runs of the corresponding sprocket chains 123 and 125. These runs yield laterally to receive the fish fed thereto. An additional pair of outwardly biased sprockets 134 engage outer runs of sprocket chains 123, 125 adjacent drive sprockets 141, FIG. 1.

Drive housing 143 is secured to housing 15 by the mount bracket 145 and encloses suitable drive mechanism 144 connected to a drive motor 193, FIG. 9 within the motor housing 15 for drivingly engaging the corresponding drive shafts 142 for the sprockets 141.

The portion for the present decapitating machine which is directed to the evisceration of the fish in a continuous manner is shown at the right side of FIG. 1 and in detail in FIGS. 3 through 8.

The power rotated cutter disc 147 is arranged in a vertical plane and centrally underlies feed sprocket chains 123 and 125 directly in advance of the end of the transverse fish support and feed channel 101. The fish individually in a line are supportably engaged by the sprocket chains 123 and 125 as in FIG. 4 and longitudinally advanced into operative engagement with the power rotated cutter disc 147 having a series of sharpened peripheral teeth 149. P As shown in FIGS. 3 and 6 as the individual fish in a line are transported over the upper cutting edge portions of the knife 147, each fish is slit at 150 along the belly side thereof during continuous longitudinal movement thereof. The power rotated cutter disc 147 has applied to opposite sides thereof a hub 151 of reduced diameter having a body which is transversely arcuate, FIG. 6, over which the slit edge portions of the fish expand laterally outward and are outturned as at 155. This facilitates opening up of the fish for the subsequent evisceration thereof. Water pipe 154, FIGS. 3 and 10 is connected to main water pipe 94 and delivers a water spray adjacent the cutter disc 147.

A series of angular notches 153 are formed within peripheral portions of the hub body 151 to assist in the longitudinal removal of heavy gut portions on power rotation of the cutter disc 147.

Said disc is suitably secured upon the outer end of drive shaft 156 and keyed thereto. Said shaft extends transversely of and below the corresponding feed conveyors 123 and 125 and connected to power transmitting means 195 within the housing, FIG. 9, so that the cutter disc 147 rotates in a counter clockwise direction.

As the individual fish move longitudinally to the right of FIG. 3 supported and advanced by the corresponding continuous feed sprocket chains 123 and 125, the fish as already slitted at 150 from the belly side moves onto, over and along inclined arcuate top of spreader support plate 159.

Said support plate at its bottom edge 160 is supported as at 165 in an upright position to framework 23. Said plate centrally underlies the sprocket chains 123 and 125 and is coplanar with and forward of cutter disc 147. The trailing end of plate 159 is concave as at 163 so as to be arranged closely adjacent cutter disc 147. Thus the fish F advances onto plate 159 with its belly side longitudinal slit at 150 receiving said plate. On further longitudinal movent of the individual fish over said plate, its arcuate edge 161, extends into and along the fish body partly opening it up for flushing out.

The pair of substantially upright branch water conduits 167 are bored through plate 159 and have outlets 169 which correspond to top edge 161 of said plate. Plate 159 has fittings 171 adjacent the horizontal bottom edge 160 of said plate. These conduits are connected to the branch water pipes 173 from water pipe 175 connected pipe 94 joined to the source of water under pressure, FIG. 10.

Therefore, as the fish are successively moved over the support plate 159, there is a further opening out the body cavity thereof. The application of pressurized water through the conduits 167 facilitates the evisceration of the fish, washing out the body contents which drop by gravity into a suitable collection tray 13 underlying the machine housing.

The corresponding horizontal feed sprocket chains 123, 125 continue to support the fish successively in a horizontal path as they move over the support plate 159 and over the closely adjacent coplanar upright power rotated scraper disc 177. Said disc extends into the end arcuate recess 178 in plate 159. The scraper disc 177 is secured to the transverse power drive shaft 179 which extends transversely of the sprocket chains 123 and 125 and spaced thereunder. Said shaft is suitably connected to a part of the drive mechanism 197 connected to motor 193 within the housing 15, FIG. 9, so that the scraper disc 177 rotates counter clockwise as shown by the arrow.

The scraper disc 177 includes a series of radially extending cutting edges 181 FIG. 8, and with adjacent radial apertures 183 formed therein for further cleaning out the cavity of the fish completing the eviscerating operation wherein the fish move longitudinally in the path 185 around the scraper disc 177 and drop by gravity into a suitable collector 187 mounted upon the base 23 fragmentarily shown in FIGS. 1–3.

As the fish move over the scraper disc 177 this corresponds to the rear end portions of the sprocket chains 123 and 125 shown in FIG. 1. At this area the fish are guided longitudinally so as to move over the scraper disc 177 in the path shown at 185, FIG. 3, into collector 187.

Water pipe 189 delivers pressurized water to flush the area down stream of scraper disc 177.

A splash guard 201, FIG. 1, is hinged at 203 to housing 15 and normally overlies knife 63 and water pipes 99. Said guard is shown elevated in FIG. 2. Water pipes 154, adjacent cutter disc 147, FIGS. 3 and 10, deliver flushing water to interior portions 150 of the fish.

Having described my invention, reference should now be had to the following claims:

I claim:

1. In a fish decapitator having a framework including a base, a power driven horizontally disposed continuous conveyor belt mounted upon said framework including a series of flexibly connected open ended containers extending transversely of said belt, each container adapted to receive and transport a fish, an elongated adjustable stop upon said framework spaced from said containers and parallel to said belt, a power rotated brush overlying said belt and mounted upon said framework and rotatable in a plane at right angles to the length of said belt, the brush bristles on rotation frictionally engaging each fish thereunder during feeding of said belt laterally advancing each fish outwardly of its container successively to said stop, and a power rotated knife mounted upon said framework for rotation in a plane parallel to and spaced from said stop laterally outward of said belt, for successively severing the fish heads during longitudinal movement of said belt, each fish lying upon one side with its belly forward, the decapitated fish moving in its container to and downwardly around the end of said conveyor in a horizontal position and dropping from its container with its belly down;

the improvement comprising an elongated fish feed channel upon said framework underlying and extending transversely of the forward end of said belt successively receiving said fish as they drop from said belt guidably retaining each fish horizontally with its belly side down;

a continuous power operated feed sprocket chain centrally underlying said channel along its length for supporting and advancing said fish successively in a line within said channel in a transverse path;

a pair of opposed horizontal coplanar flexible laterally yieldable fish feeder means mounted upon said framework adjacent one end of said channel longitudinally thereof for successively receiving each fish therebetween frictionally and operatively engaging its opposite sides and advancing said fish longitudinally;

and a power rotated cutter disc journaled upon said framework and arranged in a vertical plane centrally underlying said feeder means and operatively engaging and slitting each fish on its belly side along its length as it is advanced longitudinally over said cutter disc.

2. In the fish decapitator of claim 1, the leading edge of each fish container being inclined outwardly at an acute angle to the vertical to facilitate dropping of the fish therefrom.

3. In the fish decapitator of claim 1, said fish feeder means including continuous laterally related sprocket chains;

spaced laterally yieldably idler sprockets mounted upon said framework coplanar to and supporting the one ends of said sprocket chains;

and a pair of laterally spaced power driven sprockets upon said framework coplanar to and supporting the other ends of said sprocket chains.

4. In the fish decapitator of claim 3, opposed pairs of additional laterally yieldable sprocket chain supporting idler sprockets within said sprocket chains respectively engaging the inner portions of each said sprocket chain;

and spring means interconnecting adjacent pairs of said additional idler sprocket chains in compression, adjacent portions of said pair of continuous sprocket chains yieldably receiving and engaging said fish automatically compensating for the widths thereof.

5. In the fish decapitator of claim 1, an upright power rotated scraper disc journaled upon said framework having a series of radially extending cutting edges arranged forward of, adjacent to and coplanar with said support plate and arranged centrally of and below said fish feeder means, over which each fish is fed by said feeder means, said scraper disc further cleaning out the interior of said fish along its length as it moves longitudinally thereover;

the decapitated and eviscerated fish successively advancing over said scraper disc and falling by gravity for accumulation within a suitable container.

6. In the fish decapitator of claim 3, each of said laterally related sprocket chains including a plurality of pivotally interconnected segments having a series of longitudinally spaced lateral feed projections thereon for frictional and supporting feed engagement with said fish;

there being inwardly projecting fish hold down flanges along the top of each segment.

7. In a fish eviscerator having a framework, an elongated feed channel upon said framework adapted to successively receive decapitated fish in a horizontal position belly side down;

a continuous power operated feed sprocket chain centrally underlying said channel along its length for supporting and advancing said fish succesively in a line within said channel;

said sprocket chain lying in a vertical plane and including a plurality of pivotally interconnected segments, each segment having a pair of outwardly diverging guide members for frictional and supporting engagement with the belly and sides of said fish retaining the fish belly side down;

a pair of opposed horizontal coplanar flexible laterally yieldable fish feeder means mounted upon said framework adjacent one end of said channel longitudinally thereof for successively receiving each fish therebetween frictionally and operatively engaging its opposite sides and advancing said fish longitudinally;

said fish feeder means including continuous laterally related sprocket chains;

spaced laterally yieldable idler sprockets mounted upon said framework coplanar to and suporting the one ends of said sprocket chains;

and a pair of laterally spaced power driven sprockets upon said framework coplanar to and supporting the other ends of said sprocket chains;

a power rotated cutter disc journaled upon said framework and arranged in a vertical plane centrally underlying said feeder means and operatively engaging and slitting each fish on its belly side along its length as it is advanced longitudinally over said cutter disc;

an upright spreader support plate mounted upon said framework having an inclined elongated transversely arcuate top edge forward of, adjacent of and coplanar with said cutter disc and arranged centrally of said fish feeder means, over which each fish is longitudinally fed by said fish feeder means;

said support plate further separating the fish halves along its length during longitudinal movement thereof;

and an upright power rotated scraper disc journaled upon said framework having a series of radially extending cutter edges arranged forward of, adjacent to and coplanar with said support plate and arranged centrally of and below said fish feeder means, over which each fish is fed by said feeder means, said scraper disc further cleaning out the interior of said fish along its length as it moves longitudinally thereof;

the eviscerated fish successively advancing over said scraper disc and falling by gravity for accumulation within a suitable container.

* * * * *